United States Patent

Heinrich et al.

[11] 4,058,518
[45] Nov. 15, 1977

[54] WATER-INSOLUBLE MONOAZO 3-CYANO-4-METHYL-6-HYDROXY-2-PYRIDINE DYESTUFFS

[75] Inventors: Ernst Heinrich, Frankfurt am Main; Joachim Ribka, Offenbach, both of Germany

[73] Assignee: Cassella Farbwerke Mainkur Aktiengesellschaft, Germany

[21] Appl. No.: 659,205

[22] Filed: Feb. 19, 1976

Related U.S. Application Data

[63] Continuation-in-part of Ser. No. 483,006, June 25, 1974, abandoned, which is a continuation of Ser. No. 331,477, Feb. 12, 1973, abandoned.

[30] Foreign Application Priority Data

Feb. 18, 1972 Germany ............................ 2207661

[51] Int. Cl.² .............................................. C09B 29/36
[52] U.S. Cl. .................................... 260/156; 260/578
[58] Field of Search ......................................... 260/156

[56] References Cited

U.S. PATENT DOCUMENTS 3,487,066  12/1969  Ritter et al. ........................ 260/156
3,640,674  2/1972  Berrie et al. ..................... 260/156 X

FOREIGN PATENT DOCUMENTS 6,918,333  6/1970  Netherlands ........................ 260/156

Primary Examiner—Charles F. Warren
Attorney, Agent, or Firm—Connolly and Hutz

[57] ABSTRACT

Dyestuffs, free of ionic groups, of the formula:

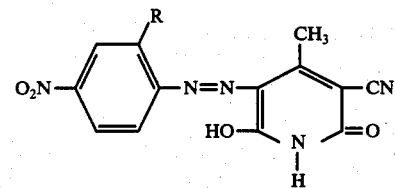

wherein R is alkyl having 1 to 6 carbon atoms and the utility thereof in the dyeing and printing of synthetic materials deep yellow with excellent fastness properties.

3 Claims, No Drawings

WATER-INSOLUBLE MONOAZO 3-CYANO-4-METHYL-6-HYDROXY-2-PYRIDINE DYESTUFFS

CROSS-REFERENCE TO RELATED APPLICATIONS

This is a continuation-in-part of pending application Ser. No. 483,006 filed June 25, 1974 now abandoned, which in turn is a continuation of parent application Ser. No. 331,477 filed Feb. 12th, 1973 and now abandoned.

The present invention relates to valuable, novel monoazo dyestuffs, free of ionic groups, of the formula:

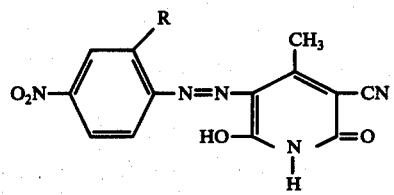

I wherein R is alkyl, either straight chain or branched, having 1 to 6 carbon atoms.

The dyestuffs of this invention may be obtained by diazotizing an amino of the formula:

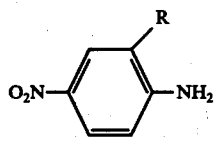

II which is free of ionic groups and wherein R has the above-stated meaning and then coupling the resulting product with 3-cyano-4-methyl-6-hydroxy-2-pyridone of the formula:

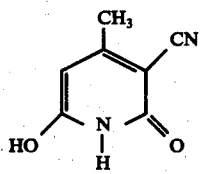

III

It may be advantageous, in view of the formulation of the dispersion dyestuffs, to diazotize a mixture of two or more amines of formula II and to couple the resulting product with 3-cyano-4-methyl-6-hydroxy-2-pyridone.

The dyestuffs of formula I and the compound of formula III may be present in tautomeric forms. For example, the following tautomeric formulae are feasible for the dyestuffs of formula I and the compound of formula III:

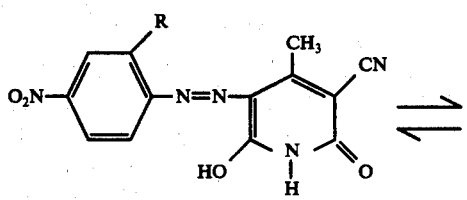

I

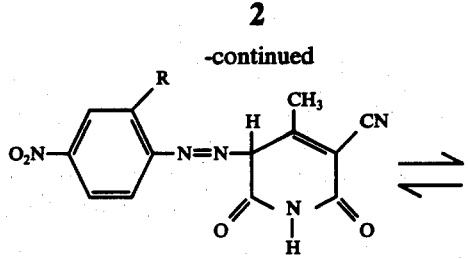

Ia

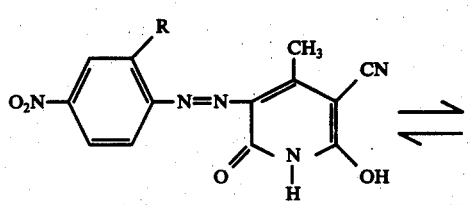

Ib

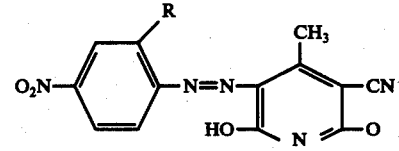

Ic

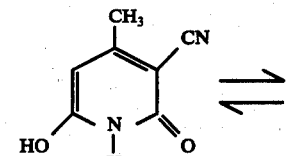

III

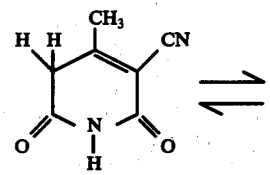

IIIa

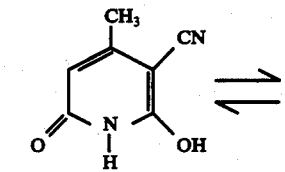

IIIb

IIIc

Us used herein, including the claims, formula I and formula III are intended to embrace all possible tautomeric forms.

Coupling pomponent III may be prepared in accordance with the method of Bobbith and Scola (J. Org. Chem. 25, 560) by the condensation of acetoacetic acid ethyl ester with cyanacetamide in the presence of potassium hydroxide in boiling methanol.

The dyestuffs of this invention are particularly suitable for the dyeing and printing of patterns of synthetic materials, as for example, polyolefins, polyvinyl compounds, polyacrylonitrile, cellulose-2½-acetate, cellulose triacetate and particularly polyester materials, e.g., polyethylene glycol terephthalate. They yield, in accordance with the customary dyeing and printing processes, deep yellow dyeings and prints with very good fastness properties.

The dyestuffs of this invention possess particularly very good fastness properties, i.e., very good fastnesses to light, to washing, to washing in the presence of sodium perborate, to washing in the presence of hypochlorite, to prespiration, to dry cleaning, to gas fading, to soda boiling as well as to dry-heat pleating and setting. Moreover, they exhibit a high stability to pH-variation in the course of the dyeing and printing process and a very low susceptibility to staining of wool.

Compared with closely related prior art dyes, the dyestuffs of our present invention, more particularly that described in the following working Example 1, have a greater coloring strength, a superior build-up capacity, exert a better fastness to dry-heat pleating and setting as well as a substantially greater evenness of the color tone if different dyeing and printing presesses are utilized and different substrates, such as polyester, cellulose-2½-acetate, cellulose triacetate and polyamides are dyed and printed.

The dyeing of the stated fiber goods with the dyestuffs of this invention occurs suitably from an aqueous suspension in the presence of carriers between about 80°–110° C., in the absence of carriers between about 110°–140° C., as well as according to the so-called thermofixing process at about 180°–230° C. The printing of said materials may be carried out in such a manner that the goods printed with the novel dyestuffs are steamed in the presence of a carrier at temperatures between about 80°–110° C. or even in the absence of a carrier at about 110°–140° C. or also treated in accordance with the so-called thermofixing process at about 180°–230° C.

The instant dyestuffs are also suitable for dyeing of the initially named hydrophobic materials in organic solvents and for the dyeing en masse.

The preferred dyestuffs of this invention are those of formula I wherein R is alkyl having 1 to 2 carbon atoms.

EXAMPLE 1 a. 15.2 parts by weight 2-methyl-4-nitroaniline in 300 parts by weight water with the addition of 36.0 parts by weight 30% hydrochloric acid are diazotized at 0° to 5° C. with a solution of 7.7 parts by weight sodium nitrate in 50 parts by weight water. The filtered, clear diazo solution is then allowed to flow into a suspension of 16.5 parts by weight 3-cyano-4-methyl-6-hydroxy-2-pyridone in 400 parts by weight water and 16.6 parts by weight caustic soda (33° Be) and the reaction temperature is maintained during the coupling at 0° to 5° C. by the addition of 500 parts by weight ice. The resulting dyestuff is drawn off upon completion of coupling, washed neutral with water and dried. It is a yellow powder which dissolves in concentrated sulfuric acid to give a yellowish orange color.

b. 1.0 parts by weight of the thusly obtained finely dispersed dyestuff of the formula:

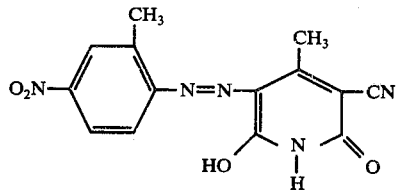

are stirred into 2000 parts by weight water. The mixture is standardized with acetic acid to a pH value of 5–6 and mixed with 4 parts by weight ammonium sulfate and 2 parts by weight of a commercial dispersing agent which is based on a naphthalenesulfonic acid formaldehyde condensate.

Into a thusly obtained dye bath, there are introduced 100 parts by weight of a polyester fabric of polyethylene glycol terephthalate. Dyeing is continued 1½ hours at 120°–130° C.

After subsequent washing, reductive after treatment with a 0.2% alkaline sodium dithionite solution for 15 minutes at 60°–70° C., washing and drying, there is obtained a deep, yellow dyeing with very good fastness properties, particularly a very good light and thermofixing fastness.

The dyestuff obtained according to 1(a) in dyeing shows a very high synthesis capacity. It has excellent pH stability and only slightly stains the wool when dyeing a polyester-wool mixed fabric.

EXAMPLE 2 a. 16.6 parts by weight of 2-ethyl-4-nitroaniline are diazotized, as described in Example 1, coupled with 16.5 parts by weight 3-cyano-4-methyl-6-hydroxy-2-pyridone and isolated. The resulting dyestuff is a yellow powder which, when dissolved in concentrated sulfuric acid, yields a yellowish orange color.

b. 30 parts by weight of the dyestuff obtained in accordance with Example 2(a) of the formula:

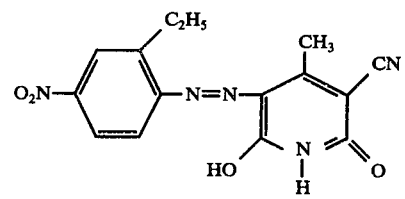

are incorporated in finely divided form into a printing paste which contains 45.0 parts by weight carob bean flour, 6.0 parts by weight of the sodium salt of 3-nitro-benzene-sulfonic acid and 3.0 parts by weight citric acid to 1000 parts by weight. After printing, drying and fixing in the thermofixing frame for 45 seconds at 215° C., washing and finishing, as described under 1(b) of Example 1, with this printing paste there is obtained, on a polyester fabric, a deep, yellow print of very good fastness properties, particularly very good light and thermofixing fastness.

The dyestuff obtained according to 2(a) of this Example shows in dyeing a high synthesis capacity. It has excellent pH stability and only slightly stains the wool when dyeing a polyester-wool mixed fabric.

The dyestuff yields a yellow print of high light fastness in the printing of triacetate fabric when it is used in the form of the above printing paste and the printed fabric, after drying, is steamed for 10 minutes at 1.5 atmospheres gauge pressure, washed, soaped, again washed and dried.

The table below presents further dyestuffs of the formula:

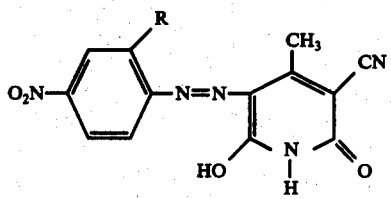

which yield yellow dyeings or printings on polyester materials with equally very good fastness properties.

| No. | R |
|---|---|
| 1. | —CH₂—CH₂—CH₃ |
| 2. | —CH(CH₃)₂ |
| 3. | —CH₂—CH₂—CH₂—CH₃ |
| 4. | —CH(CH₃)CH₂—CH₃ |
| 5. | —CH₂—CH(CH₃)₂ |
| 6. | —C(CH₃)₃ |
| 7. | —CH₂—CH₂—CH₂—CH₂—CH₃ |
| 8. | —CH₂—CH₂—CH(CH₃)₂ |
| 9. | —CH(CH₂—CH₃)₂ |
| 10. | —CH₂—CH₂—CH₂—CH₂—CH₂—CH₃ |

We claim:
1. Monoazo dyestuffs of the formula:

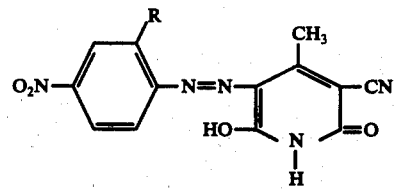

wherein R is alkyl having 1 to 2 carbon atoms.
2. The monoazo dyestuff of claim 1 wherein R is $CH_3$.
3. The monoazo dyestuff of claim 1 wherein R is $C_2H_5$.